INVENTOR
WILLIAM E. VELVEL

2,765,492
EXTRUSION APPARATUS

William E. Velvel, Claymont, Del., assignor to E. I. du Pont de Nemours and Company, Wilmington, Del., a corporation of Delaware Application February 23, 1955, Serial No. 489,868

6 Claims. (Cl. 18—15)

This invention relates to apparatus for the extrusion of continuous films. More particularly it relates to such apparatus which has means for precisely adjusting the lips of the extrusion slot orifice. The invention also relates to an orifice lip for an extrusion apparatus.

An object of this invention is to provide an improved apparatus for the extrusion of thin films. Another object is to provide such apparatus which produces thin films of uniform thickness over extended periods of operation. Yet another object is to provide such an apparatus which can be precisely adjusted upon assembly. A further object is to provide such apparatus which is simple in construction but dependable in operation. A still further object is to provide such apparatus which can be adjusted easily and can be assembled and placed in operating condition readily by a skilled mechanic. Still other objects will be apparent from the following description:

The film extrusion apparatus of this invention will now be explained with reference to the accompany drawings wherein similar reference numerals refer to similar parts throughout the several views and wherein.

Figure 1:
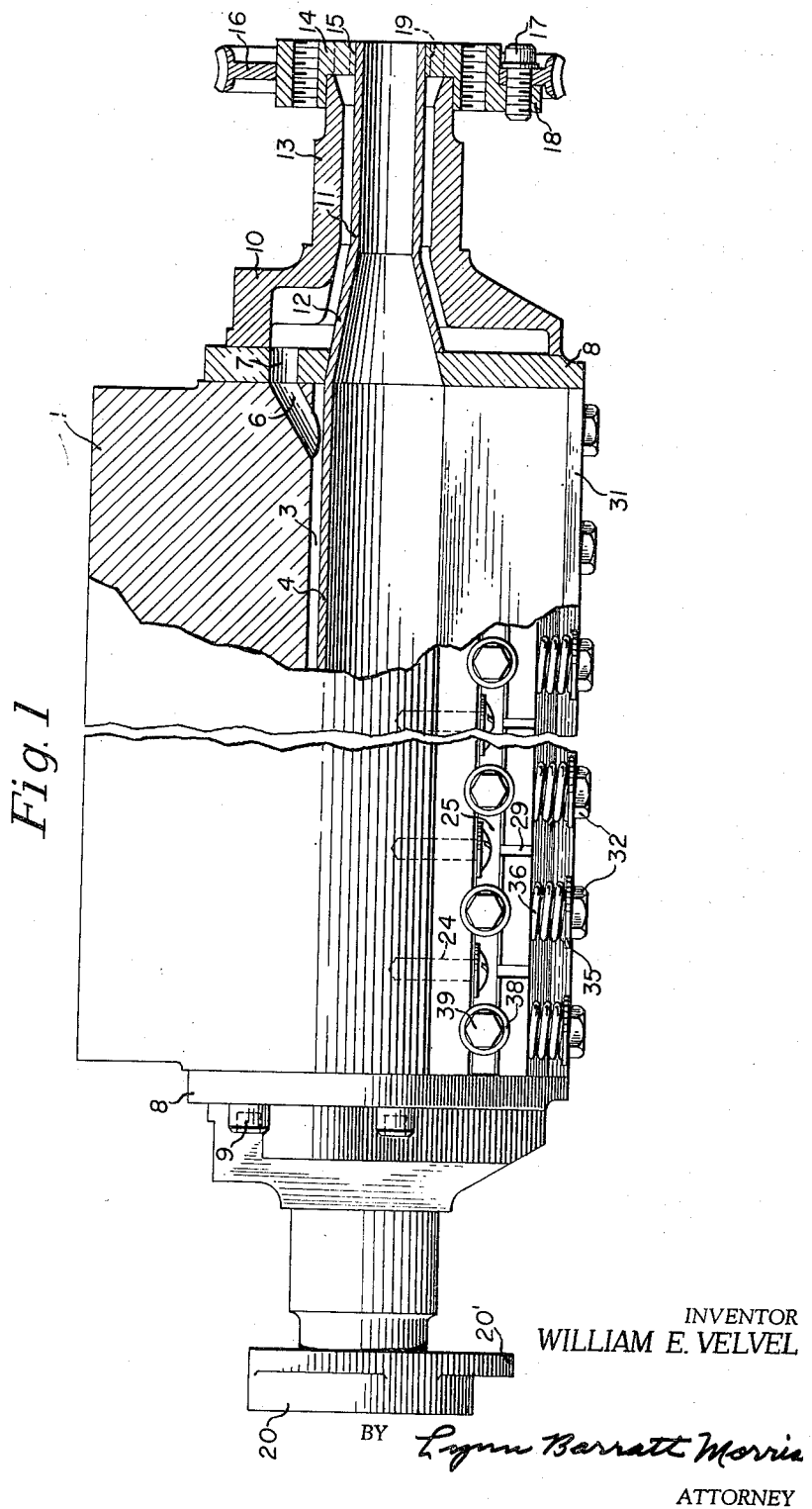
Fig. 1 is a side elevation, with parts in section, of the extrusion apparatus.
Figure 2:
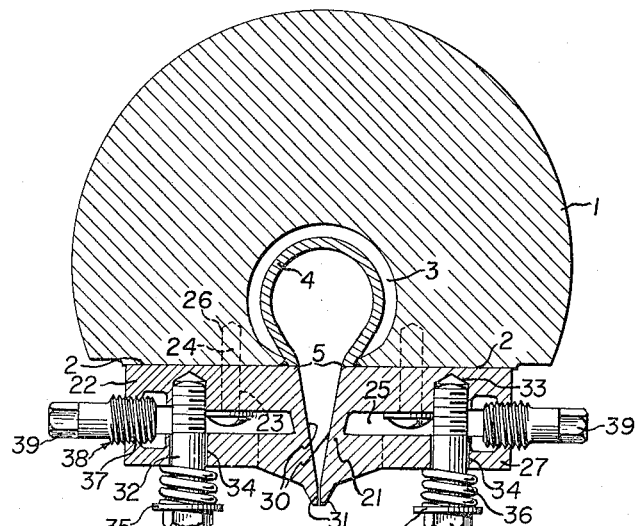
Fig. 2 is a vertical cross-sectional view, with parts in section, taken substantially along the line 2—2 of Fig. 3.
Figure 3:
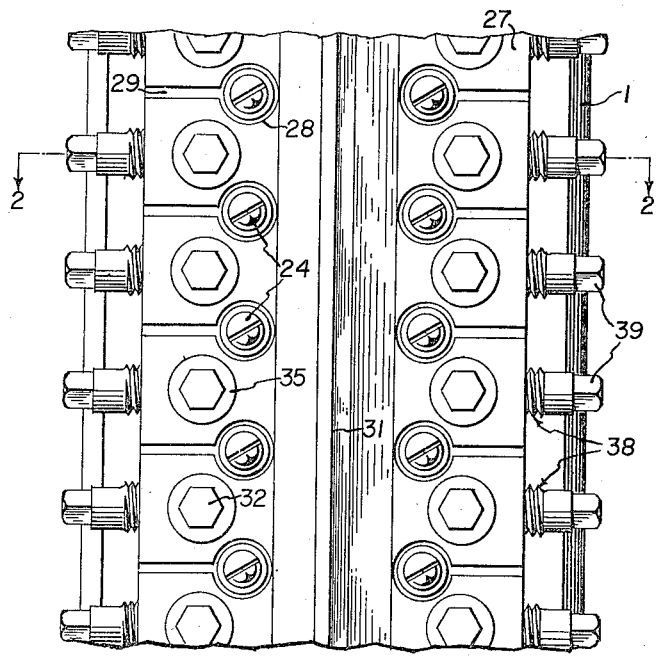
Fig. 3 is a plan view of part of the bottom of the extrusion device.

Referring now to the drawings, the film extrusion apparatus comprises a main body member 1 composed of a metal having a flat bottom 2. An enlarged U-shaped longitudinal channel 3 is located in the center of the body, the spaced side walls of the channel terminating in two longitudinal edges where they meet the bottom. Fitted in channel 3 is a similarly shaped longitudinal sleeve 4 composed of a metal capable of receiving and retaining a high polish. The side walls of this sleeve are welded to body member at the longitudinal edges where the channel meets the bottom wall. The lengthwise opening 5 between the sleeve edges constitutes a wide orifice or outlet from the sleeve. The outer wall of the sleeve is spaced from the channel walls so as to provide a space for the circulation of a heat-exchange fluid. A plurality of diagonal passages 6 communicate with said space and with horizontal passages 7 in end plates 8 which are held to body member 1 by means of bolts 9. Affixed to each end plate by a weld joint is a bell-shaped hub 10 which is adapted to receive a metal tube 11 having a flared or frustro conical portion 12 the inner end of which abuts the end of sleeve 4. The hub has a smooth cylindrical portion 13 which is journalled in a suitable bearing on a frame (not shown). The end of the hub is shaped to receive a cap 14 which has a hole 15 interfitting with the outer surface of the tube. This cap can be fixed to the hub by means of screw threads, a weld, or other suitable means, or it can be force-fitted onto the hub. A worm gear 16 is placed over one cap and attached to it by a suitable means, for example by means of screw 17 threadably engaged with lug 18 on the collar. The outer walls of tube 11 are spaced from the inner walls of the bell-shaped hub for the circulation of a heat-exchange fluid. A plurality of openings 19 are provided in the ends of the cap and they communicate with a suitable source of heat-exchange fluid.

The other hub has a collar 20 with a lug 20′ which can be fastened to a frame member after the hubs and associated extrusion device are adjusted, by means of the worm gear and associated means (not shown), to the desired position.

Beneath the body member and fastened thereto on each side of the lengthwise slot opening 5 in the channel sleeve, there are disposed two coacting lip members 21 which are U-shaped and substantially identical in construction except that they are reversed in position. The upper arm 22 of each lip member has a flat upper surface which fits against the flat bottom surface of the body member. The interfitting surfaces are carefully machined so that they will fit closely together. The upper arm is provided with a row of holes 23 preferably uniformly spaced through which extend screws 24. If desired, the holes may be larger in diameter than the screws. The flat inner heads of the screws contact the inner surface of the upper arm and the heads are disposed in lateral open-ended slot 25. These screws are threadably engaged with suitable threaded holes 26 in the bottom surface of the body member.

In bottom arm 27 immediately beneath each screw head is a hole 28 for the insertion of a tool to adjust the screws. A narrow lateral slot 29 extends from each hole to the outer edge of the lower arm of the U-shaped lip member.

The bottom web or inner end wall 30 of each lip member slants for most of its length and together they form a tapered orifice to lead fluid from the channel sleeve to the flat portions 31 of the end walls of the lip members that define the narrow lengthwise slot orifice.

Screws 32 which are threadably engaged in respective holes 33 in the upper arm extend through similarly spaced holes 34 (of larger diameter than the screws) in bottom arm 27. Between the head of each screw 32 and the outer surface of the arm is a washer 35 and a coil spring 36. The row of screws 32 is spaced a substantial distance from the inner end wall of the lip member, which admits of flexing (within the elastic limits of the material) of the lip member at the end defining the narrow orifice lip.

The open ends of slot 25 (i e., between the upper arm 22 and bottom arm 27) have threaded arcuate portions 37 in the surfaces of such arms. These threaded arcs have their bisecting vertical plane passing through the center of screws. Threadably engaged with the arcuate portions are tapered screws 38 having polygonal shaped ends 39 adapted to receive a tool (not shown) for adjusting them toward or away from the longitudinal axis of the extrusion orifice. Each spring insures that each segment of the lower arm between narrow lateral slots 29 is always in contact with the tapered screw in the central part of such segment. The taper of the thread, the pitch of the thread and the lever ratio can be selected to give the desired mechanical advantage between screw rotation and lip movement. In a practical design, eleven adjusting screws having a nominal outside diameter of 0.5625 inch, a pitch and lead of 32 threads per inch and a taper of 0.375 inch per foot, one and three-eighths inches apart in a lip fourteen and three-fourths inches long provide local adjustment of about 0.004 inch (i. e., 0.002 inch each way from an original central position) of the lips between each section of the lower arm between the narrow slots. Hence, by using two adjustable lips, as shown, a total range of extrusion orifice openings from 0.002 inch to approximately 0.010 inch can be accomplished. While in the preferred aspect of the invention there are two adjustable lips, if desired, one lip can be made solid and non-flexible. By placing small grooves in the solid or movable lip or lips, films with beaded edges can be made.

In assembling the device the orifice lips are fastened to the body member by first aligning the lips along an axis at approximately the spacing desired and then tightening the screws 24. The width of the slot opening between the lips in each segment between narrow slots 29 is measured carefully. Tapered screws 38 are then adjusted to correct for any deviations from a straight line. A viscous fluid material, e. g., molten polyethylene terephthalate is then passed into an end or ends of the device through tubes 11 and the fluid flows through the orifice lips. The extruded film is measured carefully along its lateral axis and the irregularities in thickness noted. The appropriate tapered adjusting screws are then turned to compensate for the differences.

Various kinds of materials can be extruded in the apparatus of this invention. Among such materials are film-forming polymers including polyethylene, polyvinyl chloride, copolymers of vinyl chloride and vinyl acetate, polymethyl methacrylate, polystyrene, polyethylene terephthalate; regenerated cellulose, cellulose acetate, cellulose propionate, cellulose acetate butyrate and ethyl cellulose; rubber hydrochloride, etc. These materials can be extruded in the form of an aqueous dispersion, solution in a solvent, or in molten or liquefied form. The apparatus is useful in coating gelatino silver halide emulsions, and other dispersions of finely divided materials in water-permeable colloids.

When the material extruded is at an elevated temperature, a heat-exchange fluid, e. g., diphenyl oxide, chlorinated biphenyl, chlorinated naphthalene and paraffin hydrocarbon oils heated to the requisite temperature is passed through the jacket surrounding the channel-shaped sleeve member. In order to prevent heat losses the body member and supply pipes can be covered with heat-insulation material. For materials which do not require temperature control the sleeve tube and ducts or passages for the heat-exchange fluid can be eliminated.

The body member and orifice lips can be made of any strong metal or metal alloy. The body member and lips can be made of closegrain cast iron, die steel, including vanadium alloy steel, titanium, brass, bronze etc. The sleeve and tubes can be made of die steel, stainless steel, titanium or brass or other tough material which will receive a high polish. The particular metal used will depend on the corrosive characteristics of the particular material to be extruded. The various screws, springs and collar can be made of steel, stainless steel, titanium or other suitable metal or alloy.

An advantage of the present invention is that it provides an extrusion apparatus of simple design which admits of fine adjustment of long orifice lips. The apparatus provides for positive positioning because there is no lost motion or back lash in the adjusting screws. The screws are all under load in the same direction at all times insuring positive action. A further advantage of the lip units is that there is less interdependence between lengthwise sections of the lip at the orifice points. This permits of a more localized adjustment of the lip position.

A still further advantage of the invention is that there is no jamming or binding of the adjusting mechanism at extreme deflections. There is more resistance to parallel displacement of the movable portion of the lip relative to the fixed portion, making the lip less sensitive to deflection by internal hopper pressure. The lips do not tend to vibrate and cause chatter during pressure extrusion as do prior art designs.

The adjusting screws are readily accessible which is of considerable importance in an extrusion apparatus. An other primary advantage is that the apparatus has a small number of inexpensive parts.

A further advantage of the invention is that the novel orifice lip or lips can be used on various types of hoppers having a differently shaped chamber and elongated opening or openings.

The embodiments of the invention in which an exclusive property or privilege is claimed are defined as follows:

1. A lip member for an extrusion apparatus comprising a U-shaped member, the outer surface of the bottom web of which defines an orifice lip, the upper arm being provided with a plurality of holes for the passage of screws to hold the arm to the body of an extrusion apparatus, the lower arm having lateral slots located adjacent the holes in the upper arm and dividing said lower arm into segments, a hole in each segment, a spring-biased screw passing through each hole and threadably engaging the upper arm, the end of the longitudinal slot between the arms having threaded arc portion in each inner surface located adjacent said spring-biased screws and a tapered screw threadably engaging with said arc portions.

2. A lip member as defined in claim 1 wherein said holes are in rows parallel to the axis of the orifice lip.

3. In a film extrusion apparatus comprising a body member having a lengthwise channel in its bottom surface, a pair of spaced orifice-defining lip members on each side of said channel attached to its bottom surface and endplates for said body member and lip members, the improvement which consists in at least one of said lip members comprising a U-shaped member, the outer surface of the bottom web of which defines an orifice lip, the upper arm being provided with a plurality of holes for the passage of screws to hold the arm to the body of an extrusion apparatus, the lower arm having lateral slots located adjacent the holes in the upper arm and dividing said lower arm into segments, a hole in each segment, a spring-biased screw passing through each hole and threadably engaging the upper arm, the end of the longitudinal slot between the arms having threaded arc portions in each inner surface located adjacent said spring-biased screws and a tapered screw threadably engaging with said arc portions.

4. In a film extrusion apparatus comprising a body member having a lengthwise channel in its bottom surface, a pair of spaced orifice-defining lip members on each side of said channel attached to its bottom surface and endplates having passages communicating with said channel, the improvement which consists in at least one of said lip members comprising a U-shaped member the outer surface of the bottom web of which defines an orifice lip, the upper arm being fastened to the bottom by screws in a row parallel to the axis of orifice lip, the heads of the screws being located in the open ended slot between the arms of said latter member, the lower arm having a row of holes opposite the heads of said screws, narrow slots extending from said holes to the outer edge of the lower arm dividing said arm into segments, a row of holes in said lower arm spaced laterally from and parallel to the first row, spring-biased screws threadably engaging the upper arm passing loosely through said holes, the end of the slot between the arms having threaded arc portions in each opposing surface opposite said spring-biased screws and a tapered screw threadably engaging with said arc portions.

5. An apparatus as set forth in claim 4 wherein both of said lip members have the construction defined in such claim.

6. A film extrusion apparatus comprising a body member having a lengthwise channel in its bottom surface, a U-shaped sleeve in said channel and spaced therefrom, a bell-shaped endplate having a tube interfitting with an end of the sleeve and ducts for passing a heat exchange fluid around said sleeve, a pair of orifice-defining lip members on each side of said channel attached to its bottom surface at least one of said lip members comprising a U-shaped member the outer surface of the bottom web of which defines an orifice lip, the upper arm being fastened to the bottom by screws in a row parallel to the axis of orifice lip, the heads of the screws being located in the open ended slot between the arms of said latter member, the lower arm having a row of holes opposite the heads of said screws, narrow slits extending from said holes to the outer edge of the lower arm dividing said arm into segments, a row of holes in said lower arm spaced laterally from and parallel to the first row, spring-biased screws threadably engaging the upper arm passing loosely through said holes, the end of slot between the arms having threaded arc portions in each opposing surface opposite said spring-biased screws and a tapered screw threadably engaging with said arc portions.

References Cited in the file of this patent

UNITED STATES PATENTS

| | | |
|---|---|---|
| 1,990,078 | Kinsella et al. | Feb. 5, 1935 |
| 2,718,661 | Russell | Sept. 27, 1955 |